3,474,054
SURFACE COATING COMPOSITIONS CONTAINING PYRIDINE SALTS OR AROMATIC SULFONIC ACIDS
Marion M. White, Detroit, Mich., assignor to The Permalac Corporation, Detroit, Mich., a corporation of Michigan
No Drawing. Filed Sept. 13, 1966, Ser. No. 579,006
Int. Cl. C08g 17/13, 9/08, 9/24
U.S. Cl. 260—15                              9 Claims

ABSTRACT OF THE DISCLOSURE

Amino or unmodified alkyd resin surface coating compositions containing amine salts of aromatic sulfonic acids (e.g., the pyridine salt of p-toluene sulfonic acid) cure at temperatures substantially below the 180° F. usually required to cure such compositions.

---

This invention relates to coating compositions containing amine salts of aromatic sulfonic acids. In particular, this invention relates to amino resin or unmodified alkyd resin compositions containing an amine salt of an aromatic sulfonic acid.

Acid curing resins such as amino resins or unmodified alkyd resins are frequently used in surface coating compositions. They impart to the finished coating an extremely durable finish having high gloss and excellent color retention. Despite the excellent surface coating obtained from paints and enamels containing these resins, they suffer from the disadvantage that they are not air drying, but require baking at temperatures from about 180° to 400° F. to harden or cure the coating film. For this reason they are usually referred to as "baking enamels."

A second method of curing these coatings is by the addition of a strong acid catalyst such as hydrochloric acid prior to application. This method generally avoids the necessity of baking the coating to as high a temperature but suffers from the fact that the acid cannot be added until immediately prior to applying the coating. If the acid catalyst is added at the manufacturing stage the coating composition will gel and harden during storage and be unfit for use.

Adding the acid catalyst immediately prior to use not only adds substantially to the cost of the coating operation, but is hazardous, sometimes resulting in injury to workmen. Furthermore, this method suffers from the disadvantage that all of the coating to which the acid catalyst has been added must be used within a short period or it will gel and harden in its container and be wasted. Thus, a need exists for an amino resin or unmodified alkyd resin containing coating composition which will cure without a baking operation or at relatively low temperatures without the need of adding a catalyst immediately prior to use.

An object of this invention is to provide an improved coating composition. A further object is to provide an amino resin or unmodified alkyd resin containing coating composition which will cure at relatively low temperatures and which does not require the addition of acid catalysts prior to use. A still further object is to provide a storage-stable amino resin or unmodified alkyd resin which does not require the addition of an acid catalyst prior to use. Another object is to provide a method of coating a surface with a film of an amino resin or unmodified alkyd containing composition which does not require the addition of an acid catalyst nor baking at high temperatures.

These and other objects are accomplished by providing an amino resin or unmodified alkyd resin coating composition of the type normally requiring an acid catalyst or a high temperature bake in order to cure, containing a catalytic amount of an amine salt of an aromatic sulfonic acid.

In a preferred embodiment of this invention the amino resin is selected from the group consisting of urea-formaldehyde resins and melamine-formaldehyde resins.

In a further preferred embodiment of the invention the amine salt of an aromatic sulfonic acid is a tertiary amine salt. In a most preferred composition of this invention the amine salt catalyst is the pyridine salt of p-toluene sulfonic acid.

As previously stated, the curing catalysts provided by this invention are useful with amino resins. Examples of these amino resins are urea-formaldehyde resins and melamine-formaldehyde resins. These types of resin are commercially available and are well-known and extensively used in the paint industry ("Fundamentals of Paint, Varnish and Lacquer Technology," p. 207–221, E. Singer, The American Paint Journal Co., St. Louis, Mo.). The resins may be the simple condensation product of urea or melamine with formaldehyde or they may be modified by several known methods such as by including in the condensation a hydroxy compound ("Surface Coatings and Finishes," p. 89–104, P. L. Gordon, Chemical Publ. Co., New York, 1954). Some especially useful modified amino resins are those modified by condensation with an alcohol such as butanol.

The quantity of the amino resin in the coating composition can vary over a wide range. Percentage composition as used herein refers to the composition of the coating vehicle but excluding pigment. A useful range of amino resin content is from 5 to 35 weight percent, and a preferred range is 10 to 15 weight percent.

Alkyd resins are condensation products of polybasic acids such as maleic acid, phthalic acid or trimellitic (including their anhydrides) with a polyol such as ethylene glycol, glycerin or pentaerythritol ("Surface Coatings and Finishes," ibid, p. 45–70). These alkyd resins can be modified by inclusion of fatty acids or drying oils which enter into the condensation and impart air drying properties to the resin. When these resins are employed without modification or when they are very short on fatty acid or drying oil modification they will not air dry in a reasonable time and require baking at temperatures of from about 180–400° F. in order to cure to a hard dry finish. It is these non-air drying alkyd resins that are referred to as unmodified alkyd resins. They may contain some modifier but an amount insufficient to impart air drying properties. The cure time and baking requirements of these resins can also be lessened by addition of an acid immediately prior to use. As before, if the acid is added during formulation of the paint the resin will cure during storage and be unusable.

Alkyd resin content of the coating compositions can vary over a wide range. A useful range is from 2–40 weight percent of alkyd solids, and a preferred range is from 5–10 weight percent.

Highly desired coating properties are obtained using coating compositions containing both amino resins and unmodified alkyd resins. As with the individual resins, curing of coatings containing mixtures of these resins can be obtained by baking at temperatures from 180–400° F. or by the use of an acid catalyst added just prior to use. The curing catalysts described in this invention are eminently useful in compositions containing any of the foregoing amino resins, unmodified alkyd resins or mixtures of these resins. Their use leads to compositions having good storage stability which, when applied, will cure in a short time at temperatures below the 180° F. minimum baking temperature employed with similar compositions but not containing the curing catalysts of this invention.

The curing catalysts employed in this invention are amine salts of aromatic sulfonic acids. They are prepared by the reaction of an amine with an aromatic sulfonic acid. Useful amines are ammonia methyl amine, dimethyl amine, diethyl amine, aniline, phenylene diamine, dioctyl amine, N-methyl aniline, diethanol amine, N-methyl morpholine, piperidine, and the like. Preferred amines are the tertiary amines such as trimethyl amine, triethyl amine, trioctyl amine, mixed fatty tertiary amines, triethanol amine, and the like. The most preferred amine is pyridine.

The aromatic sulfonic acids employed in making the curing catalysts are compounds having at least one benzene ring with at least one sulfonic acid group bonded thereto. Some examples are benzene sulfonic acid, p-benzene disulfonic acid, xylene sulfonic acid, naphthalene sulfonic acid, p-tert-butylbenzene sulfonic acid, and p-nonlybenzene sulfonic acid. The most preferred aromatic sulfonic acid is p-toluene sulfonic acid.

The salts are readily prepared by reacting about one equivalent of the aromatic sulfonic acid per mole of amine. An equivalent of the sulfonic acid is one mole divided by the number of sulfonic acid groups in the molecule. It is usually preferred to use some excess of the amine in making the salt to be sure there is no free acid. A preferred reactant ratio is from about 1.0 to 1.5 moles of amine per equivalent of sulfonic acid, and a most preferred range is from 1.0 to 1.2 moles of amine per equivalent of aromatic sulfonic acid.

The reaction of the amine reactant with the aromatic sulfonic acid may be conducted without a solvent. However, the use of a solvent is preferred because this makes it easier to carry out the reaction and the resulting solution of the curing catalyst is more readily added to the coating composition. Preferred solvents are alcohols such as methanol, ethanol, n-propanol, isopropanol, n-butanol, sec-butanol, and the like. The most preferred solvent is n-propanol.

The following example illustrates the preparation of the curing catalysts of this invention. All parts are parts by weight unless otherwise specified.

EXAMPLE 1

To a reaction vessel equipped with a stirrer was added 1,000 parts of n-propyl alcohol. While stirring, there was added 172.2 parts of p-toluenesulfonic acid. Stirring was continued until it dissolved. Following this, there was added 79.1 parts of pyridine. The resulting solution contained about 20 weight percent of a curing catalyst of this invention. It was used by merely adding the desired amount of the solution to an amino resin and unmodified alkyd containing resin composition, resulting in a storage-stable coating composition which, when applied to a surface, formed a coating which cured to a hard finish at 100° F. in less than 30 minutes.

EXAMPLE 2

In the mixing vessel of Example 1 is placed 2,000 parts of n-butanol. There is then added 284 parts of p-nonylsulfonic acid and 86.9 parts of pyridine. The reaction is exothermic and allowed to warm, which aids solution. The resulting solution contains about 15 weight percent of an active curing catalyst of this invention.

In the above example, similar results can be obtained using any of the previouly listed amines, aromatic sulfonic acids or solvents in the recommended quantities. The amount and type of solvent will vary according to the concentration and the solubility of the amine salt in the particular solvent chosen.

The final coating compositions are prepared by mixing the curing catalyst with the other constituents of the composition including the amino and/or unmodified alkyd resin and other materials conventionally used in these compositions such as solvents; for example, aromatic hydrocarbons such as toluene, xylene, and the like; aliphatic and cycloaliphatic hydrocarbons such as heptane, cyclohexane; alcohols such as n-butanol, isopropanol, methyl Cellosolve, and the like; ketones such as methylethyl ketone; esters such as amyl acetate, and other miscellaneous solvents. The compositions can also contain resins other than the amino-formaldehyde and unmodified alkyd resin; for example, cellulosics, modified alkyds, acrylics, acrylonitrile/styrene, silicone, urethane, vinyl, and the like.

The compositions also usually contain pigments such as iron oxides, lead carbonates, titanium dioxide, chromium oxides, carbon black, ultramarine blue, phthalocyanines, and the like.

The amount of active catalyst added can vary. All that is required is that there is an amount present sufficient to catalyze the cure of the coating in a short time at ambient or only slightly elevated temperatures. A useful range is from about 0.1 to 3 weight percent. A more preferred range is from 0.3 to 2 weight percent, and a most preferred range is from 0.5 to 1 weight percent.

The following examples serve to illustrate the coating compositions of this invention. All parts are parts by weight.

EXAMPLE 3

Coating compositions were prepared by mixing the ingredients to give the following compositions:

(A)

| | Parts |
|---|---|
| Urea-formaldehyde resin | 25.16 |
| Alkyd (short oil non-air drying) | 37.75 |
| Xylene | 37.09 |
| Pyridine salt of p-toluene sulfonic acid | 1.0 |

(B)

| | |
|---|---|
| Urea-formaldehyde resin | 9.44 |
| Alkyd (short oil non-air drying) | 6.62 |
| Cellulose acetate butyrate | 17.36 |
| Xylene | 66.58 |
| Pyridine salt of p-toluene sufonic acid | 2.85 |

(C)

| | |
|---|---|
| Urea-formaldehyde resin | 40.0 |
| Alkyd (short oil non-air drying) | 112.0 |
| Xylene | 380.0 |
| Pyridine salt of p-nonyl sulfonic acid | 7.0 |
| Titanium dioxide | 300.0 |
| Amorphous silica | 100.0 |

(D)

| | |
|---|---|
| Urea-formaldehyde resin | 80.0 |
| Alkyd (short oil non-air drying) | 230.0 |
| Solvent (65% xylene, 15% naphtha, 10% butyl Cellosolve, 10% butyl alcohol) | 380.0 |
| Trioctyl amine salt of benzene sulfonic acid | 6.0 |
| Titanium dioxide | 300.0 |

(E)

| | |
|---|---|
| Urea-melamine-formaldehyde resin | 115.0 |
| Medium oil length tung oil modified alkyd (air drying) | 220.0 |
| Xylene | 280.0 |
| Titanium dioxide | 285.0 |
| Pyridine salt of p-toluene sulfonic acid | 12.0 |

(F)

| | |
|---|---|
| Urea-formaldehyde resin | 120.0 |
| Non-modified alkyd | 100.0 |
| Medium oil length linseed oil modified alkyl (air drying) | 120.0 |
| Xylene | 300.0 |
| Butyl alcohol | 50.0 |
| Piperidine salt of naphthalene sulfonic acid | 3.0 |

(G)

| | Parts |
|---|---|
| Melamine-formaldehyde resin | 35.0 |
| Unmodified alkyd | 40.0 |
| Medium oil length linseed oil modified glycerol phthalate alkyl (air drying) | 100.0 |
| Carbon black | 150.0 |
| Pyridine salt of p-toluene sulfonic acid | 1.5 |
| Xylene | 100.0 |
| Butyl Cellosolve | 25.0 |
| Butanol | 25.0 |

(H)

| | |
|---|---|
| Cellulose acetate butyrate | 75.0 |
| Urea-formaldehyde resin solids [1] | 41.0 |
| Unmodified glycerol-phthalate alkyd resin solids [2] | 28.6 |
| Solvent [3] | 228.0 |
| Pyridine salt of p-toluene sulfonic acid [4] | 3.0 |

[1] Added as 60% solution in xylene.
[2] Added as 65% solution in xylene.
[3] Commercial aromatic type solvent.
[4] As a 20% solution in n-propanol.

I claim:
1. A surface coating composition adapted to cure to a hard resistant coating at temperatures below 180° F. comprising a resin selected from the group consisting of urea-formaldehyde resin, melamine-formaldehyde resin and non-air drying alkyd resins selected from the group consisting of unmodified alkyd resins and short oil alkyd resins and mixtures thereof containing a pyridine salt of an aromatic sulfonic acid.

2. The composition of claim 1 wherein said resin is a urea-formaldehyde resin.

3. The composition of claim 2 wherein said pyridine salt is the pyridine salt of p-toluenesulfonic acid.

4. The composition of claim 1 wherein said resin is melamine-formaldehyde resin.

5. The composition of claim 4 wherein said pyridine salt is the pyridine salt of p-toluene sulfonic acid.

6. The composition of claim 1 containing, exclusive of pigment, from about 5 to 35 weight percent of a resin selected from the group consisting of urea-formaldehyde resin and melamine formaldehyde resin, from 0 to about 40 weight percent of said unmodified alkyd resin and from about 0.1 to 3 weight percent of the pyridine salt of p-toluene sulfonic acid.

7. The composition of claim 6 containing from about 10 to 30 weight percent of cellulose acetate butyrate, from about 5 to 20 weight percent of a urea-formaldehyde resin, from about 5 to 20 weight percent of an unmodified glycerol-phthalate alkyd resin and from about 0.1 to 3 weight percent of the pyridine salt of p-toluene sulfonic acid.

8. The method of coating a surface comprising applying a lamina of a composition of claim 1 to said surface and curing said composition at a temperature below 180° F. for a period sufficient to cure said composition.

9. A composition of claim 1 wherein said aromatic sulfonic acid is p-toluene sulfonic acid.

References Cited

UNITED STATES PATENTS

| 2,687,397 | 8/1954 | Dannenberg | 260—834 |
| 2,853,459 | 9/1958 | Christenson et al. | 260—850 |
| 2,875,164 | 2/1959 | Ball et al. | 260—15 |
| 3,293,324 | 12/1966 | Tropp et al. | 260—850 |
| 3,317,474 | 5/1967 | Jones | 260—17.3 |

WILLIAM H. SHORT, Primary Examiner

E. M. WOODBERRY, Assistant Examiner

U.S. Cl. X.R.

117—161; 260—16, 67.6, 69, 75, 850